Patented July 1, 1947

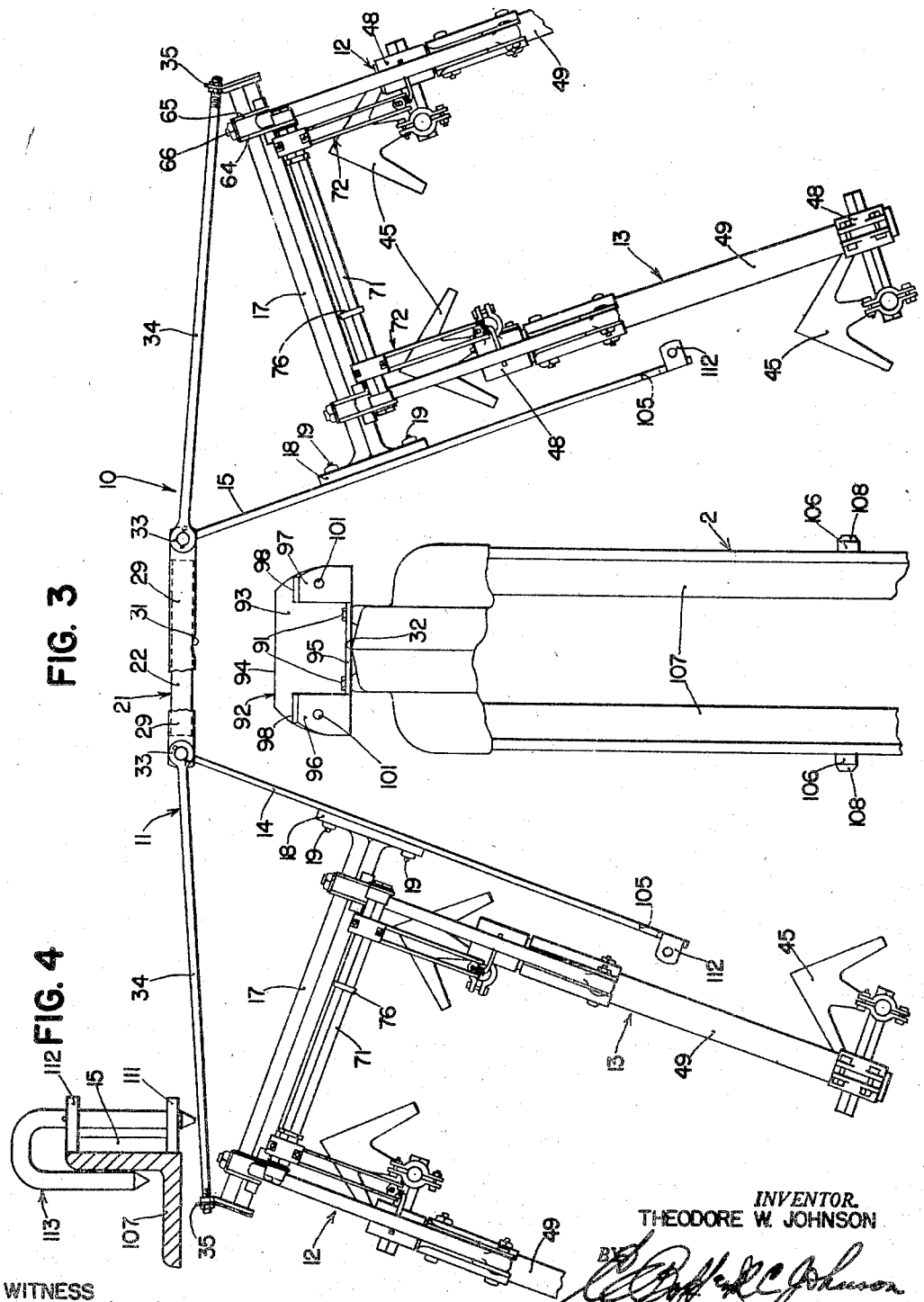

2,423,148

UNITED STATES PATENT OFFICE 2,423,148

QUICK DEMOUNTABLE CULTIVATOR

Theodore W. Johnson, Moline, Ill., assignor to Deere & Company, Moline, Ill., a corporation of Illinois Application November 6, 1944, Serial No. 562,155

25 Claims. (Cl. 97—47)

This invention relates generally to agricultural machines and more particularly to ground working implements of the type that is adapted to be mounted on and carried by a farm tractor, commonly known as integral implements.

The object and general nature of the present invention is the provision of an implement of this type in which means is specifically provided to facilitate attaching and detaching the implement. Particularly, it is an object of this invention to provide an arrangement in which the implement may be mounted on the tractor merely by driving the tractor into the implement and connecting only a small number of parts, yet, when attached, the implement is securely and rigidly mounted on and connected with the tractor so as to form an integral part thereof.

These and other objects and advantages of the present invention will be apparent to those skilled in the art after a consideration of the following detailed description, taken in conjunction with the accompanying drawings in which a preferred form of the invention has been illustrated.

Referring to the drawings:

Figure 3 is a plan view of the implement shown in Figure 1, the parts being illustrated in the positions they occupy when the implement is detached from the tractor, the latter being shown in the position it occupies just a moment before connection is established.

Figure 4 is a detail view of one of the connecting means, being a section taken generally along the line 4—4 of Figure 2.

Figure 5 is a fragmentary view of the connection between each cultivator lifting pipe and the tractor power lift.

Figure 1:
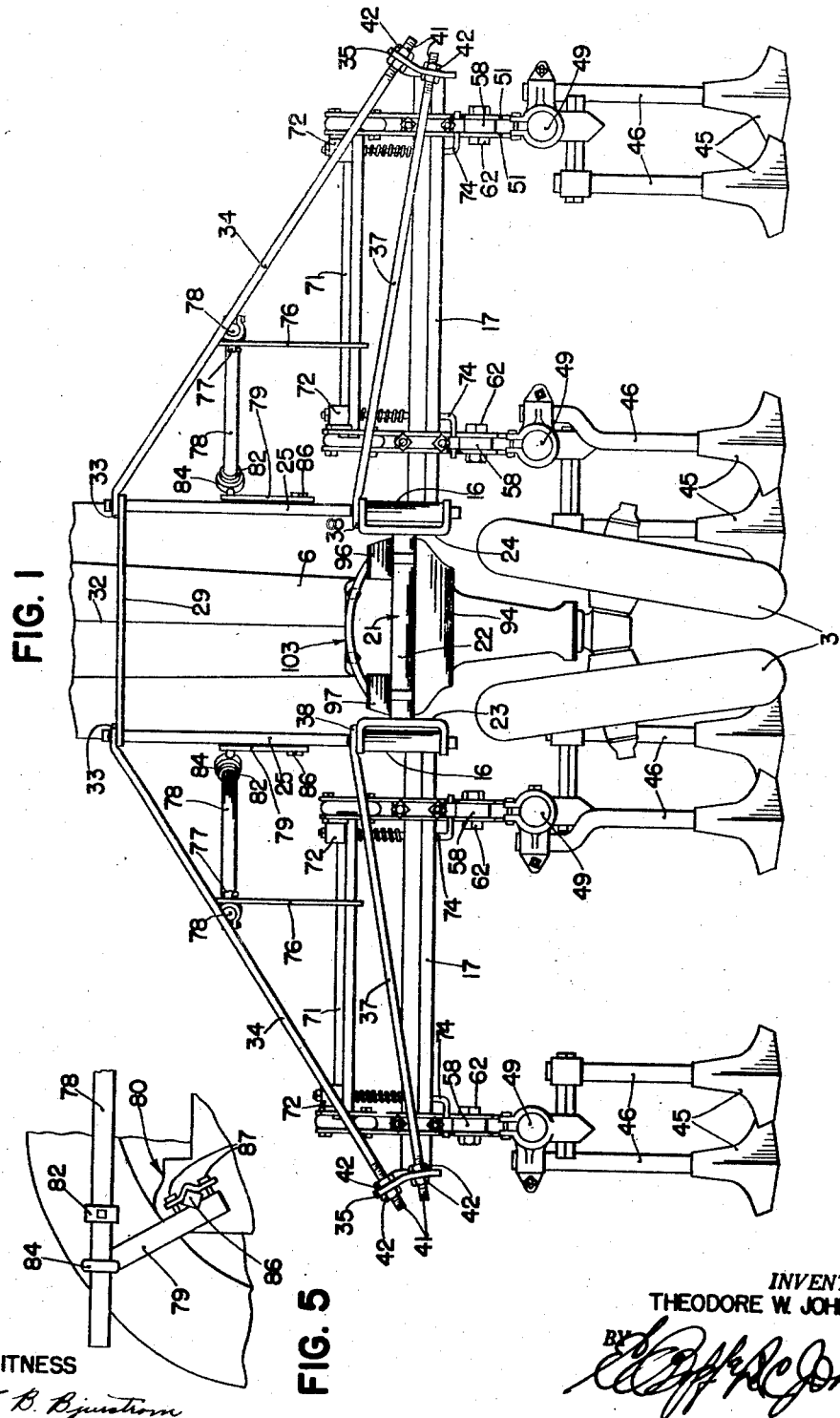
Figure 1 is a front view of the present invention as embodied in a quick detachable tractor mounted cultivator.
Figure 2:
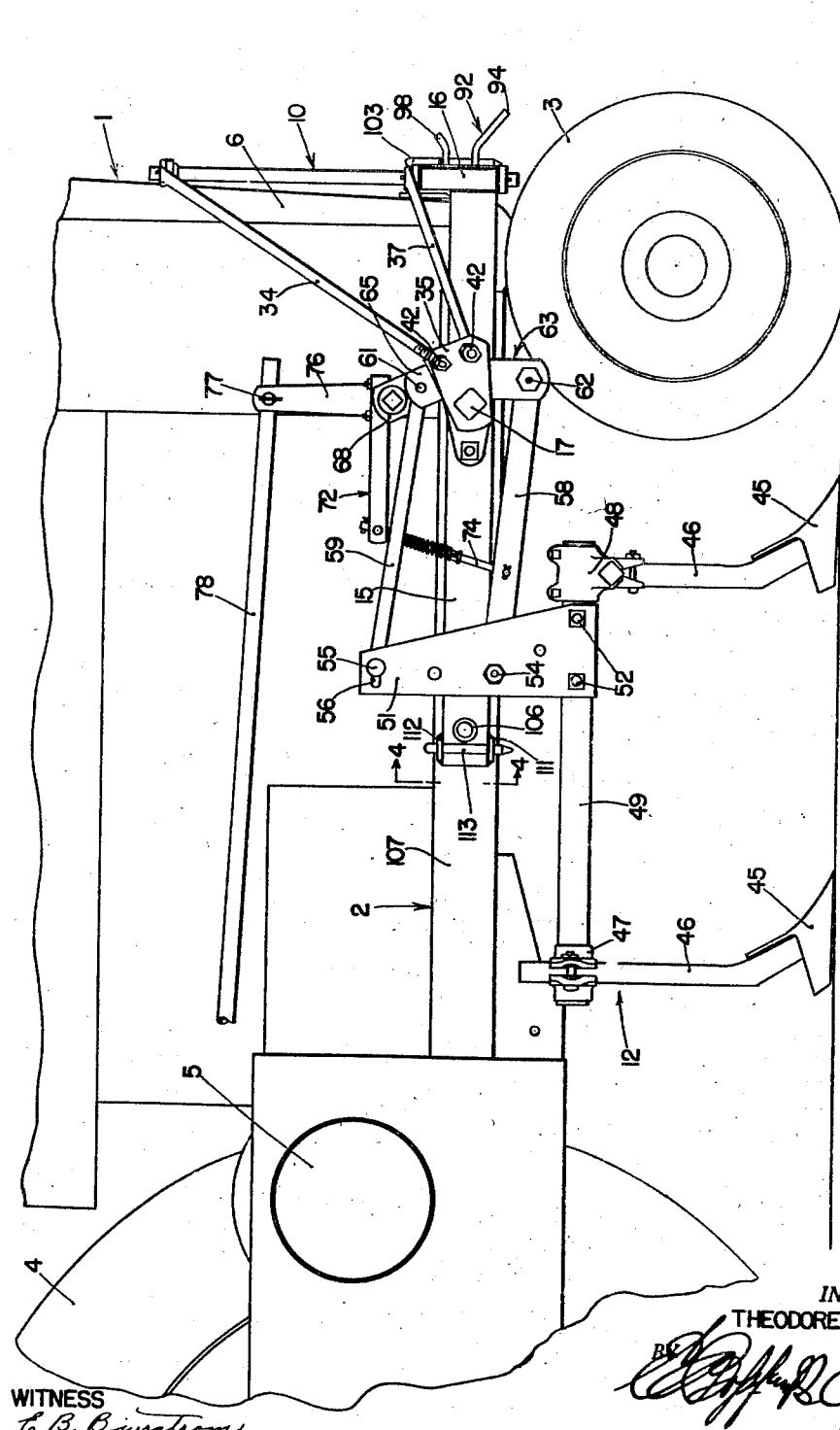
Figure 2 is a side view of the implement shown in Figure 1.

Referring first to Figures 1 and 2, the tractor is indicated in its entirety by the reference numeral 1 and is of conventional construction, embodying a frame 2 supported on dirigible front wheels 3 and rear wheels 4, the latter serving as traction means receiving power from a tractor motor 5. The dirigible front wheels 3 are supported for movement about a generally vertical axis by means of a pedestal 6 to which reference will be made later.

The tractor mounted implement, which I have chosen to illustrate the principles of the present invention, is indicated in its entirety by the reference numeral 10 and includes a specially formed attaching frame 11 and a plurality of cultivator rigs 12 and 13, the rigs 12 being laterally outer rigs and the rigs 13 being laterally inner rigs. The attaching frame 11 comprises a pair of side bars 14 and 15, each formed at its forward end with a vertical sleeve or bushing 16, the latter preferably being in the form of a short section of pipe welded or otherwise fixed to the front end of the associated side frame member. A draft bar 17 is secured, as by welding or the like, to an attaching plate 18, and the latter is apertured to receive bolts 19 or the like by which each attaching plate is securely fixed to the intermediate portion of the associated side frame members 14 and 15. The forward ends of the side frame members 14 and 15 are pivotally connected to a central attaching yoke 21 that comprises a central bar 22 and yoke members 23 and 24, the latter members being normally disposed in a vertical position and apertured to receive the lower ends of pivot rods 25 that extend through the ends of the yoke members 23 and 24 and through the pipe sections 16 to which the forward ends of the frame members 14 and 15 are welded. As best shown in Figure 1, the pivot rods 25 extend upwardly and at their upper ends are connected by a tie strap 29 which is apertured at its outer ends to receive the upper ends of the pivot rods 25 and centrally is provided with a notch 31 which engages over a central V-shaped ridge 32 formed on the pedestal 6. The upper ends of the pivot rods 25 also receive the eye sections 33 of a pair of brace rods 34 which at their outer ends are adjustably connected to a bracket plate 35. The brackets 35 are welded to the outer ends of the draft bars 17, and a second pair of braces 37 are also adjustably connected to the brackets 35 and at their inner ends are formed with eye sections 38 which receive the pivot rods 25 and lie just above the yoke members 23 and 24. Preferably, the outer ends of each of the brace rods 34 and 37 are threaded, as at 41, and receive lock nuts 42 by which the position of the rods relative to the bracket may be adjusted as desired.

So far as the present invention is concerned, the cultivator rigs 12 and 13 are largely conventional. Each rig, as best shown in Figure 2, includes one or more shovels 45 connected to the lower ends of shanks or standards 46 which, at their upper ends, are connected by clamps 47 and 48 to a rig beam 49.

The rig beam 49 of each rig is connected to the associated draft bar 17 by a pair of links and suitable attaching members. Preferably, the latter include right and left hand coupling plates 51 which, at their lower edges, are curved to fit around the associated rig beam 49 (Figure 2) and apertured to receive a pair of bolts 52 by which the coupling plates 51 are rigidly fixed to the rig beam. The coupling plates 51 are apertured to receive pivot bolts 54 and 55, the latter being adjustable in a longitudinal direction by virtue of slots 56 formed in the coupling plates 51. A lower link 58 is pivoted on the bolt 54 and an upper link 59 is pivoted on the upper bolt 55. The forward ends of the links 58 and 59 are pivotally connected, as at 61 and 62, to upper and lower portions of an associated rig hanger 63. Each rig hanger 63 includes a pair of laterally spaced apart plates 64 and 65 (Figure 3) clamped to the associated draft bar by U-bolts 66 or other suitable means. One of the plates making up the rig hanger 63 is extended upwardly, as at 68 (Figure 2), and is apertured to form a support for a lifting shaft 71 which, as best shown in Figure 3, receives a plurality of lifting arms 72, one for each rig associated with that draft bar. Each lifting arm 72 is connected with the lower link 58 of the associated rig by means of a lifting rod 74 pivotally connected at its lower end with the lower rig 58 and connected at its upper end by a trunnion or the like with the rear end of the associated lifting arm 72. By rocking the rockshafts 71 in one direction or the other, the rigs 12 and 13 may be raised or lowered, as desired. For rocking each lifting rockshaft 71 I provide an arm 76 on each lifting rockshaft 72, each arm extending generally upwardly therefrom, as best shown in Figure 1, and apertured to receive a quick detachable pin 77. The latter member is clamped to the front end of a lifting pipe or other suitable member 78 which, at its rear end, is connected to an arm 79 forming a part of the tractor power lift, which is indicated in its entirety by the reference numeral 80 and which forms a part of the tractor 1. Preferably, the rear end of the lifting pipe 78 carries a set screw collar 82 and extends through a pivot member 84 carried at the outer end of the associated lifting arm 79. The tractor power lift 80 includes a power lift shaft 86 to which the power lift arms 79 are fixed, as by clamps 87 (Figure 5).

The cultivator structure 10 as described above is attached to the tractor 1 by means that will now be described. Bolted, as at 91, to the pedestal of the tractor, is an attaching socket member indicated in its entirety by the reference numeral 92. The member 92 consists of a lower section 93 having a downturned lip portion 94, a central intermediate section 95 which is apertured to receive the bolts 91, and a pair of upper sections 96 and 97, these latter sections having upturned ends 98. The upper and lower sections 93, 96 and 97 of the socket member 92 are apertured, as at 101. The spacing between the yoke sections 94, 96, 97, is just sufficient to receive therebetween the cultivator connecting member 22 (Figure 1), and the apertures 101 are so spaced that when the attaching member 22 is seated in the socket member 92, a bail 103 (Figure 1) may be dropped through the openings 101 for the purpose of holding the attaching member 22 in the socket member 92. The lip portions 94 and 98 on the socket member 92 serve the important purpose of guiding the tractor and cultivator into proper attaching relations when driving the tractor forwardly into the cultivator, as illustrated in Figure 3. The rear ends of the frame members 14 and 15 are apertured, as at 105 (Figure 3) so as to be engageable over a pair of studs 106 which are carried by the frame 2 of the tractor. Preferably, the frame 2 of the tractor includes relatively heavy angle members 107 to the outer vertical flanges of which the studs 106 are rigidly secured, as by welding or the like. Preferably, the ends of the studs 106 are tapered, as indicated at 108, to facilitate attaching the frame bars 14 and 15 to the tractor. The rear ends of the frame bars 14 and 15 are provided with pairs of apertured lugs 111 and 112 to receive a U-shaped member 113 (Figure 4) which, after the cultivator frame bars 14 and 15 are connected to the tractor, may be dropped through the openings in the lugs 111 and 112 and over the vertical flange of the tractor frame angle 107, thus securing the cultivator frame bars 14 and 15 against accidental displacement or detachment from the tractor.

The operation of the present invention is believed to be clear from the above description. Briefly, Figures 1 and 2 show the cultivator attached in position on the tractor. When in operating position the pivots 54, 55, 61 and 62 are sufficiently loose to permit the tools to move freely up and down relative to the tractor. However, when it is desired to disconnect the cultivator from the tractor, one of the above-mentioned pivots, such as the pivot 62, is tightened sufficiently to prevent the frame and associated parts of the cultivator from falling to the ground when the tractor is removed. After the pivots, such as the pivots 62, are tightened, the farmer readily detaches the cultivator from the tractor by first lifting the attaching pins 113 off of the tractor angles 107, removing the securing bail 103 at the front, and then manually swinging the two sets of cultivators away from the tractor to the positions shown in Figure 3, thus disconnecting the rear ends of the frame bars 14 and 15 from the tractor studs 106, and lastly, disconnecting the quick detachable pins 77 and removing the lift pipes from the cultivator rig lifting arms 76 after which the lifting pipes 78 may be slid forwardly out of the pivot members 84 (Figure 5). All of this may be done in the matter of a minute or two, after which the tractor is free to be backed away from the cultivator, leaving the latter setting on the ground in substantially the position shown in Figure 3.

To reconnect the cultivator to the tractor, substantially the reverse of the above-mentioned steps, is all that is necessary. Properly lining up the tractor, the same is driven into the cultivator, as illustrated in Figure 3, the flaring portions 94 and 98 of the attaching member 92, guiding the tractor so that as it is driven forwardly the cultivator attaching bar 22 seats in the socket member 92. If the tractor is moved forwardly with some momentum, the cultivator rigs swing back against the sides of the tractor automatically engaging the studs 106 in the openings 105 without requiring that the farmer actually shift the cultivators around into position. The securing pins 113 are then dropped over the flange of the tractor frame angles 107 and the securing bail 103 dropped in position. Then by connecting up the lifting pipes 78 the cultivator is ready for use after loosening the pivot bolt that was tightened to prevent the frame and associated parts of the cultivator from falling to the ground. The seating of the cultivator attaching member 22 in the socket member 92 and the attachment at the rear ends of the frame bars 14 and 15 serve to form a rigid and secure connection between the two sets of cultivator rigs and the tractor. Any tendency for the draft bars 17 to be displaced upwardly or downwardly is resisted, first, by the cross structure provided by the braces 34 and the connecting strap 29, and second, by the engagement of the V-shaped edge 32 on the tractor pedestal in the complementarily formed notch 31 on the connecting strap 29.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A tractor-propelled implement comprising a pair of spaced apart frame sections adapted to receive a tractor therebetween, a central attaching member connected at its ends to said frame sections, means on the front of a tractor to receive said attaching member, detachable means for fixing the rear portions of said frame sections to the tractor whereby said sections may be supported on said tractor, and an implement receiving part fixed rigidly to each of said frame sections and extending generally laterally outwardly therefrom.

2. A tractor-propelled implement comprising a pair of laterally spaced apart frame sections having laterally outwardly extending draft members fixed at their inner ends to said frame sections, ground working tool means connected with said laterally outwardly extending draft members, a central member hingedly connected at its ends with said sections and accommodating laterally outwardly swinging thereof relative to said central member, a socket member fixed to the front end of the tractor, quick detachable means for holding said central member in said socket member and accommodating, when detached, the removal of the tractor from the implement by backing the tractor, attaching means operative when said sections are swung inwardly against the tractor for locking said sections to the tractor, and means providing for the support of the implement on said ground working tool means when the tractor is backed away from the implement.

3. A tractor-mounted implement comprising a pair of laterally spaced apart frame sections, a central attaching member disposed between said sections, means hingedly connecting said central attaching member at its ends with said frame sections so as to be rigid in a vertical direction, tool-receiving draft bars fixed to said frame sections rearwardly of their hinged connection with said central frame section, said frame sections being adapted to lie alongside the sides of the tractor, means serving as a socket member on the tractor to receive said central member, quick detachable means for holding said member in said socket, and bracing means extending from the outer ends of said draft members to said central attaching member.

4. A quick detachable tractor-mounted implement comprising a socket member on the front of the tractor, a pair of side frames, a central member to which said side frames are connected for swinging movement about vertical axes, said socket member receiving said central member, means for holding said central member in said socket, and means for connecting the rear portions of said side frames to the sides, respectively, of the tractor.

5. A tractor-mounted agricultural implement comprising tool supporting means including laterally spaced apart side sections, a tractor arranged in the space between said sections, a transverse connecting member connecting said sections across the front of the tractor and adapted to be detachably connected with the tractor, transverse bracing means removable from the tractor with said frame sections and extending across from one section to the other, and means connecting said transverse bracing means with the tractor so as to prevent lateral tilting of either section with respect to the tractor about longitudinal axes.

6. A tractor-mounted implement comprising a pair of side frame members, a central member to the ends of which said side frame members are hingedly connected for movement about vertical axes relative thereto when mounting the implement on the tractor, a laterally outwardly extending draft bar rigidly fixed at its inner end to each of said side frame members, means on the front of the tractor detachably receiving said central member, and means on the sides of the tractor detachably receiving said side frame members.

7. The invention set forth in claim 6, further characterized by ground working tools mounted on said laterally outwardly extending draft bars, means on said draft bars for raising said tools, and means at the rear of the tractor detachably connected with said raising and lowering means for operating the latter.

8. The combination with a tractor having a socket member at its forward end and laterally outwardly extending attaching studs at the sides thereof, of an implement attachment adapted to be mounted on the tractor comprising a central member and a pair of lateral side frame members hingedly connected to the central member, said central member being adapted to be seated in said tractor carried socket member, the rear portions of said side members being apertured to permit connecting them to the tractor over said studs, and means for holding said central member in said socket member and said rear portions of said side members on said studs.

9. A quick detachable tractor-mounted cultivator comprising an articulated frame structure including laterally outwardly extending draft bars and side frame members to which the inner ends of said draft bars are fixed and a center member to which said side frame members are hingedly connected so as to be rigid in a generally vertical direction, quick detachable means connecting the center member of said articulated frame structure to the front end of the tractor, and quick detachable means connecting said side frame members to the sides of the tractor.

10. A quick detachable tractor mounted cultivator comprising an articulated frame structure including a center member and laterally outwardly extending draft bars hingedly connected to the center member, quick detachable means connecting the center member of said articulated frame structure and the inner ends of said draft bars to the tractor, bracing means connecting the outer ends of said draft bars and reenforcing them against vertical displacement relative to the tractor, and cultivator rigs connected with said draft bars.

11. The invention set forth in claim 9, further characterized by said cultivator rigs being connected with the draft bar by generally freely swingable link means, and means for restricting the swinging of said link means when detaching the cultivator so as to render it self-supporting when detached from the tractor.

12. In a quick detachable tractor mounted cultivator, rig supporting means comprising a pair of side frame members adapted to lie alongside the sides of the tractor, draft bars rigidly connected at their inner ends to said side frame members, a central attaching member connected with the forward ends of said side frame members for hinging movement about vertical axes, and a socket member adapted to be mounted on the tractor for receiving said central member in draft transmitting relation.

13. The invention set forth in claim 12, further characterized by said socket member and said central attaching member being formed to prevent tilting of the frame structure relative to the tractor in a generally transverse vertical plane relative thereto.

14. The invention set forth in claim 12, further characterized by said socket member having forward outwardly flaring portions adapted to receive said central attaching member and to guide the same into position in said socket member.

15. In a quick detachable tractor mounted cultivator, a frame structure adapted to be detachably connected with the tractor and comprising a central member having vertically arranged yokes at its ends, a pair of hinge pins carried by said yokes and extending vertically upwardly therefrom, frame members hingedly connected to said central attaching member by the lower portions of said hinge pins, draft bars fixed at their inner ends respectively, to said frame members adjacent their forward ends, bracing members connecting the upper ends of said hinge pins, respectively, with the outer ends of said draft bars, and an anchoring strap connecting the upper ends of said hinge pins together.

16. The combination with a tractor having a socket member at its forward end, an implement attachment adapted to be mounted on the tractor comprising a central member and a pair of lateral side frame members hingedly connected to the central member, said central member being adapted to be seated in said tractor carried socket member, detachable means for fixedly connecting the rear portions of said side members to the sides of the tractor, and means for holding the rear portions of said side members connected to the sides of the tractor.

17. The combination with a tractor having a socket member at its forward end and laterally outwardly extending attaching studs at the sides thereof, an implement attachment adapted to be mounted on the tractor comprising a central member and a pair of lateral side frame members hingedly connected to the central member, said central member being adapted to be seated in said tractor carried socket member, the rear portions of said side members being apertured to permit connecting them to the tractor over said studs, and means for holding the rear portions of said side members on said studs.

18. In a quick detachable tractor mounted implement attachment, a frame structure adapted to be detachably connected with the tractor and comprising a central member, laterally disposed frame members hingedly connected with said central attaching member and adapted to lie alongside the sides of the tractor, draft bars fixed at their inner ends, respectively, to the frame members, an upper central member, and bracing members connecting the outer ends of said draft bars with said upper central member so as to react against the tractor for preventing upward tilting of the outer ends of the draft bars relative to the tractor.

19. A quick detachable agricultural implement adapted to be mounted on a tractor, comprising tool supporting means detachably associated with the tractor and including a transverse member having a length substantially the same as the width of the tractor at the front thereof, a pair of side members pivotally connected at their forward ends with the ends of the transverse member and adapted to be disposed in contact with the sides of the tractor and to lie alongside the sides of the tractor when attached thereto, means on the tractor to receive the transverse member, and means for fixing the rear ends of said side members to the sides of the tractor.

20. A quick detachable agricultural implement adapted to be mounted on a tractor, comprising tool supporting means detachably associated with the tractor and including a pair of transverse members, one disposed above the other, a pair of laterally disposed side frame members adapted to be connected to the sides of the tractor and hingedly connected at their forward ends with the ends of the lower transverse member, a laterally outwardly extending draft bar rigidly fixed at its inner end to each of the side frame members, and brace means extending from the outer ends of said draft bars upwardly and pivotally connected to the ends of said upper transverse member substantially in line with the axes of the lower hinge connection between the ends of the side frame members and the lower transverse member.

21. The combination with a tractor having an attachment receiving member, of an implement attachment adapted to be mounted on the tractor comprising a central member and a pair of lateral side frame members hingedly connected to the central member, the latter being adapted to be seated on said tractor carried attachment receiving member, and means for rigidly fixing said side frame members to the sides of the tractor.

22. An implement attachment adapted to be connected with a tractor having an attachment receiving member at its forward end, said implement attachment comprising a central member and a pair of lateral side frame members hingedly connected to the central member, the latter being adapted to be seated on said tractor carried attachment receiving member, means for rigidly fixing said side frame members to the tractor, and implement units carried by said side frame members.

23. An implement attachment adapted to be mounted on a tractor having an attachment receiving member at its forward end, said implement attachment comprising a central member, the length of said central member corresponding substantially to the width of the front of the tractor body, a pair of lateral side frame members hingedly connected at their forward ends to the outer ends of said central member, whereby said side frame members are adapted to lie close alongside the sides of the tractor, and means for rigidly fixing said side frame member to the sides of the tractor.

24. In an implement attachment adapted to be mounted on a tractor, a frame structure adapted to be detachably connected with the tractor and comprising a central member and laterally disposed frame members hingedly connected with said central member and adapted to extend along the sides of the tractor, laterally outwardly extending bars fixed at their inner ends, respectively, to the frame members rearwardly of their hinged connection with said central member, and bracing means extending from the outer portions of said bars to said central member and connected with the latter substantially at the points of hinged connection with the laterally disposed frame members.

25. The invention set forth in claim 24, further characterized by additional bracing means extending from the outer portions of said bars upwardly and inwardly and connected with the forward portion of the tractor above said central member.

THEODORE W. JOHNSON.

REFERENCES CITED

The following references are of record in the file of this patent:

UNITED STATES PATENTS

| Number | Name | Date |
|---|---|---|
| 1,541,955 | Hollenbeck | June 16, 1925 |
| 1,854,834 | Graham | Apr. 19, 1932 |
| 2,092,610 | Morris | Sept. 7, 1937 |
| 2,200,777 | Lindgren | May 14, 1940 |